United States Patent
Xie

(10) Patent No.: US 10,033,858 B2
(45) Date of Patent: Jul. 24, 2018

(54) METHOD AND SERVER FOR SECURING COMMUNICATION NUMBER

(71) Applicant: Alibaba Group Holding Limited, Grand Cayman (KY)

(72) Inventor: Daocheng Xie, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/097,195

(22) Filed: Apr. 12, 2016

(65) Prior Publication Data

US 2016/0301800 A1 Oct. 13, 2016

(30) Foreign Application Priority Data

Apr. 13, 2015 (CN) .......................... 2015 1 0172447

(51) Int. Cl.
*H04M 1/66* (2006.01)
*H04M 3/42* (2006.01)
*H04M 3/22* (2006.01)

(52) U.S. Cl.
CPC ....... *H04M 3/42008* (2013.01); *H04M 3/229* (2013.01); *H04M 3/42059* (2013.01); *H04M 3/42085* (2013.01)

(58) Field of Classification Search
CPC ......... H04W 4/02; H04W 8/18; H04W 88/02; H04W 12/02; H04W 12/06; H04W 12/08; H04W 12/12; H04M 3/42042; H04M 1/57; H04M 1/575
USPC ..................................... 455/410, 414.1, 415
See application file for complete search history.

(56) References Cited

U.S. PATENT DOCUMENTS

| 6,567,848 B1 | 5/2003 | Kusuda et al. |
| 2001/0029485 A1 | 10/2001 | Brody et al. |
| 2002/0136167 A1 | 9/2002 | Steele et al. |
| 2003/0191676 A1 | 10/2003 | Templeton |
| 2005/0076124 A1 | 4/2005 | Enderlein et al. |
| 2005/0086160 A1 | 4/2005 | Wong et al. |
| 2005/0131757 A1 | 6/2005 | Chan et al. |

(Continued)

OTHER PUBLICATIONS

PCT Search Report and Written Opinion dated Jul. 14, 2016 for PCT Application No. PCT/US16/27158, 11 pages.

(Continued)

*Primary Examiner* — Temica M Beamer
(74) *Attorney, Agent, or Firm* — Lee & Hayes, PLLC

(57) ABSTRACT

Example embodiments of the present disclosure provide an order data interaction method and a server. The interaction method includes: receiving an order request sent by a first communication terminal, and acquiring a first communication number according to the order request; allocating a second communication number to the first communication number, and setting a correlation between the first communication number and the second communication number; sending correlation information to a basic communication server, in which the correlation information carries the first communication number and the second communication number; binding the second communication number with the order request; and sending the order request having a binding relation with the second communication number to a second communication terminal. The data interaction method effectively avoids leakage of users' telephone numbers.

20 Claims, 5 Drawing Sheets

(56) References Cited

U.S. PATENT DOCUMENTS

| | | |
|---|---|---|
| 2005/0246419 A1 | 11/2005 | Jaatinen |
| 2007/0047478 A1 | 3/2007 | Balachandran et al. |
| 2008/0084982 A1 | 4/2008 | Chatterjee |
| 2009/0124270 A1 | 5/2009 | Kelley |
| 2009/0305691 A1 | 12/2009 | Suetsugu et al. |
| 2010/0216494 A1 | 8/2010 | Abdel-Moiti Moik |
| 2010/0312903 A1 | 12/2010 | Miyata |
| 2011/0159861 A1 | 6/2011 | Pratt et al. |
| 2012/0207297 A1 | 8/2012 | Tian et al. |
| 2012/0246696 A1* | 9/2012 | Boukobza ........... G06F 21/6227 726/1 |
| 2014/0146954 A1 | 5/2014 | Noldus et al. |
| 2015/0242645 A1* | 8/2015 | Burger .................... G06F 9/445 726/16 |
| 2015/0302413 A1* | 10/2015 | Dua ....................... G06Q 20/20 705/44 |
| 2016/0301663 A1 | 10/2016 | Xie |
| 2016/0301664 A1 | 10/2016 | Xie |

OTHER PUBLICATIONS

PCT Search Report and Written Opinion dated Jul. 15, 2016 for PCT Application No. PCT/US16/27152, 12 pages.

PCT Search Report and Written Opinion dated Jul. 26, 2016 for PCT Application PCT/US16/27160, 7 pages.

Office action for U.S. Appl. No. 15/097,220, dated Oct. 19, 2017, Xie, "Method and Server for Securing Communication Number", 19 pages.

* cited by examiner

METHOD AND SERVER FOR SECURING COMMUNICATION NUMBER

CROSS REFERENCE TO RELATED APPLICATION

The present disclosure claims the priority of Chinese Patent Application Number 201510172447.1 filed Apr. 13, 2015, entitled "METHOD AND APPARATUS FOR ORDER DATA INTERACTION," which is hereby incorporated by reference in its entirety. This application is also related to commonly-assigned applications: U.S. patent application Ser. No. 15/097,238, filed Apr. 12, 2016, entitled "COMMUNICATION METHOD AND SERVER," which claims the priority of Chinese Patent Application Number 201510173923.1 filed Apr. 13, 2015, entitled "METHOD AND APPARATUS FOR ORDER DATA INTERACTION;" and U.S. patent application Ser. No. 15/097,195, filed Apr. 12, 2016, entitled "METHOD AND SERVER FOR SECURING COMMUNICATION NUMBER," which claims the priority of Chinese Patent Application Number 201510173924.6 filed on Apr. 13, 2015, entitled "METHOD AND APPARATUS FOR ORDER DATA INTERACTION." The contents of the above commonly-assigned applications are hereby incorporated by reference.

TECHNICAL FIELD

The present disclosure relates to the field of communications, and, more particularly, to an order data interaction method and a server.

BACKGROUND

Communication number, such as a telephone number, is the privacy of user that sometimes has to be provided to third parties for communication. The technical problem concerns how to conduct the communication with third parties without disclosing the user's communication number to the third parties.

Generally, privacy refers to certain personal information that a person or other entity is not willing to share with others. With the development of social economics, too many privacy leakage cases occur, which causes great concern about the protection of privacy.

A telephone number is an example of information a person may want to maintain as private. A person may selectively inform others of his/her own telephone number to maintain communications between the person and the selected others, but may not want his/her own telephone number to be is otherwise distributed, which could lead to cheating calls, various promotion advertisements, junk short messages, as well as other adverse consequences.

Unfortunately, it is difficult for the conventional network system to protect user privacy, especially telephone numbers. For example, in daily life, people usually conduct online shopping, and the network system conventionally requests the users to provide telephone numbers, so as to facilitate communications with online store owners and logistics companies. Accordingly, the online stores and logistics companies obtain the users' names and telephone numbers through the network system. In this way, after a long term operation, the online stores and the logistics companies can accumulate a large number of users' contact information. Once the online stores and logistics companies are operated and managed inappropriately, the users' contact information may be leaked, that is, user privacy is leaked. Therefore, the conventional network system has a greater risk of leaking user privacy.

SUMMARY

An object of the example embodiments of the present disclosure is to provide a data interaction method, system, and server that protect user privacy. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

To solve the above technical problems, the present disclosure provides an order data interaction method, which includes: receiving an order request sent by a first communication terminal, and acquiring a first communication number according to the order request; allocating a second communication number to the first communication number, and setting a correlation between the first communication number and the second communication number; sending correlation information to a basic communication server, and the correlation information carries the first communication number and the second communication number; binding the second communication number with the order request; and sending the order request having a binding relation with the second communication number to a second communication terminal.

The present disclosure further provides a server, which includes: an order receiving module that receives an order request from a first communication terminal, and acquires a first communication number according to the order request; an allocating module that allocates a second communication number to the first communication number, and sets a correlation between the first communication number and the second communication number; a correlation information sending module that sends correlation information to a basic communication server, the correlation information carrying the first communication number and the second communication number; a binding module that binds the second communication number with the order request; and a binding information sending module that sends the order request having a binding relation with the second communication number to a second communication terminal.

The present disclosure further provides an order data interaction method, which includes: receiving an order request from a first communication terminal, and acquiring a first communication number according to the order request; sending a temporary number allocation request to a basic communication server, the temporary number allocation request carrying the first communication number; receiving a second communication number, correspondingly allocated to the first communication number, returned by the basic communication server; binding the second communication number with the order request; and forwarding the order request and the second communication number having a binding relation therebetween to a second communication terminal.

The present disclosure further provides a server, which includes: an order receiving module that receives an order request from a first communication terminal, and acquires a first communication number according to the order request; a temporary number request sending module that send a temporary number allocation request to a basic communication server, the temporary number allocation request carrying the first communication number; a temporary number receiving module that receives a second communication number, correspondingly allocated to the first communication number, returned by the basic communication server; a binding module that binds the second communication number with the order request; and a binding information sending module that forwards the order request and the second communication number having a binding relation therebetween to a second communication terminal.

As shown from the technical solutions provided by the example embodiments of the present disclosure, during the flow processing of order data, the present disclosure binds a temporarily allocated second communication number with an order request and sets a correlation between the second communication number and a first communication number used by a user. Thus, during the whole flow processing of an order request, a relevant third party may only acquire the second communication number, and contact the user by using the second communication number, thereby effectively preventing the third party from acquiring the first communication number used by the user, and protecting user privacy.

BRIEF DESCRIPTION OF THE DRAWINGS

To clearly demonstrate the technical solutions in the example embodiments of the present disclosure, the accompanying drawings that are used in the descriptions of the present disclosure are briefly introduced below. Apparently, the accompanying drawings described below merely represent some of implementations of the present disclosure. Persons of ordinary skill in the art may further derive other accompanying drawings with reference to the accompanying drawings herein, without making creative efforts.

DETAILED DESCRIPTION

To enable those skilled in the art to better understand the technical solutions of the present disclosure, the technical solutions in the example embodiments of the present disclosure are described below with reference to the accompanying drawings in the example embodiments of the present disclosure. Apparently, the described example embodiments merely represent a part of and not all of the embodiments of the present disclosure. Based on the example embodiments of the present disclosure, all the other example embodiments derived by persons of ordinary skill in the art, without using creative efforts, shall fall within the protection scope of the present disclosure.

Figure 1:
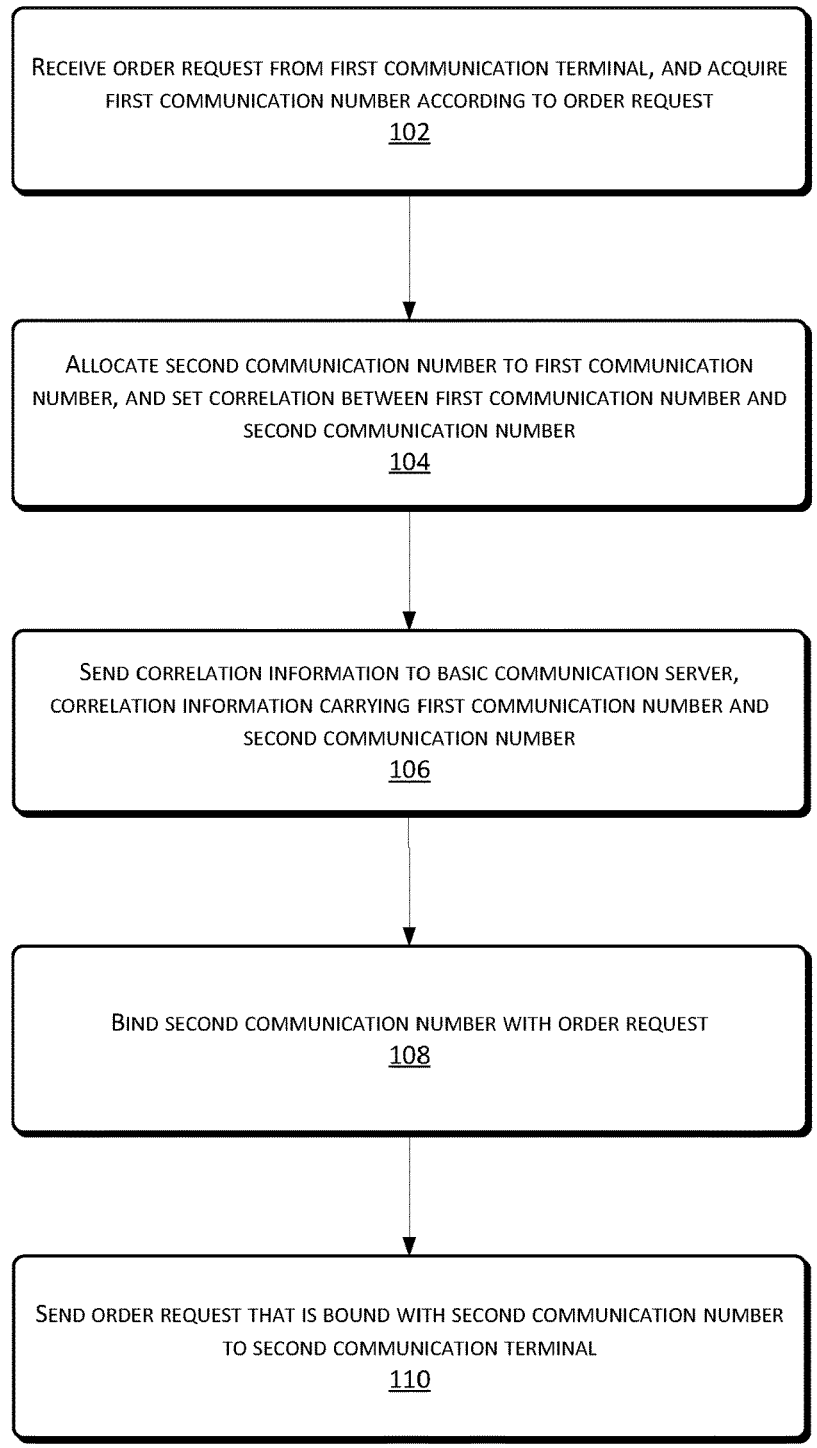
FIG. 1 is a flow chart of an example data interaction method according to an example embodiment of the present disclosure.

Referring to FIG. 1, which is a flow chart of a data interaction method provided according to an example embodiment of the present disclosure, in which the method includes the following steps.

At 102, an order request from a first communication terminal is received, and a first communication number according to the order request is acquired.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal is used by a user to send an order request.

In this example embodiment, the order request may include ordering evidence in a trading transaction, and its specific content may include a commodity and/or service ordered by a user.

In this example embodiment, the order request may carry the first communication number, and, for example, the order request may include the first communication number. In this way, after the order request is received, the first communication number is acquired. The order request may also not include the first communication number. In this case, through identity information included in the order request, the first communication number corresponding to the identity information is read from a database such as a local database.

In this example embodiment, the first communication number may be a user's telephone number, which may be a landline telephone number or a mobile phone number. There is no restriction on the number segment.

At 104, a second communication number is allocated to the first communication number, and a correlation between the first communication number and the second communication number is set.

In this example embodiment, the second communication number may be used as a temporary communication number. The allocating a second communication number to the first communication number may include: pre-storing at least one second communication number locally, and selecting one from the at least one second communication number to allocate to the first communication number; or, after the order request is received, generating a second communication number according to a pre-set rule.

In an example embodiment, a communication number set is set locally, and the communication number set includes at least one second communication number. In this way, a value range of the second communication number is effectively defined, and usage condition of the second communication number is managed. For example, in the current situation of selecting the existing communication numbers, it is feasible to use the seldom used numbers as temporary communication numbers; it is also feasible to use numbers in a certain segment as temporary communication numbers. For example, numbers falling within "95000000000~95011111111" are taken as temporary communication numbers.

In this example embodiment, the correlation between the first communication number and the second communication number is set. For example, such set may include the following: the second communication number and the first communication number may be stored and correlated with each other in a manner of a data table, one column in the data table stores the first communication number, another column stores the second communication number, and the first communication number and the second communication number correlated with each other are located in the same line. Alternatively, the first communication number and an index of the second communication number may be stored corresponding to each other. For instance, a serial number is given to each second communication number in the communication number set, and the serial number is an index of the corresponding second communication number. By using the index, a second communication number is uniquely determined. Thus, by way of storing the first communication number and the index of the second communication number corresponding to each other, the second communication number corresponding to the first communication number is figured out.

At 106, correlation information is sent to a basic communication server and the correlation information carries the first communication number and the second communication number.

In this example embodiment, the basic communication server may be a server of a telecom operator, which calls a communication number according to a call request.

In this example embodiment, sending the correlation information to the basic communication server indicates that there is a need to correlate the first communication number with the second communication number carried by the correlation information. When receiving a call request to the second communication number, the basic communication server converts the call request into a call to the first communication number.

In this example embodiment, the correlation information carries the first communication number and the second communication number, and it is feasible to use both the first communication number and the second communication number as a content or a part of the content of the correlation information; it is also feasible to use one of the second communication number and the first communication number as a content or a part of the content of the correlation information, with the other one being used as an attachment; further, it is feasible to use both the second communication number and the first communication number as attachments of the correlation information. For example, the second communication number is "12345678900", the first communication number is "17095058888". A content of the correlation information is "binding 095058888&12345678900", "17095058888&12345678900", "binding 17095058888" with "12345678900" as an attachment, "binding 12345678900" with "17095058888" as an attachment, or "binding" with both "17095058888" and "12345678900" used as the attachments.

At 108, the second communication number is bound with the order request.

In this example embodiment, by way of binding the second communication number with the order request, in a subsequent step for processing the order request, when a third party reads and processes the order request, the third party can only acquire the second communication number instead of the user's first communication number. Thus, the techniques of the present disclosure effectively protect the user's communication number.

In this example embodiment, the way of binding the second communication number with the order request may include: setting the second communication number as a part of the content of the order request; setting the second communication number as an attachment of the order request; storing the order request and the second communication number in a corresponding relationship; or storing an order serial number of the order request and the second communication number in a corresponding relationship, in which the order serial number uniquely identifies one order request. Certainly, the way of binding the second communication number with the order request is not limited to the above cited examples, and those skilled in the art may further make other variations under the teaching of the technical essence of the present disclosure, while all the variations shall fall within the protective scope of the present disclosure as long as the implemented functions and effects thereof are the same as or similar to that of the present disclosure.

At 110, the order request that is bound with the second communication number is sent to a second communication terminal.

In this example embodiment, the second communication terminal may be a smart phone, a desktop computer, a notebook computer, a tablet personal computer, or a smart wearable device. Certainly, a user terminal may also be a software entity that is executable by any of the devices listed above. The second communication terminal may be set at commercial operating places or facilities, for example, stores for selling products, companies for providing logistics services, or taxies.

In this example embodiment, the step of sending the order request to a second communication terminal enables the second communication terminal to acquire a content of the order request, and also to acquire the second communication number having a binding relation with the order request according to the order request. Corresponding to a binding mode between the second communication number and the order request, the second communication terminal may have a correspondingly different way of acquiring the second communication number according to the order request. For example, when the second communication number is a part of the content of the order request, the second communication number is directly read from the order request; when the second communication number is an attachment of the order request, after acquiring the order request, the second communication terminal reads the attachment of the order request, and further acquires the second communication number; and when the order request and the second communication number are stored in a server corresponding to each other, the second communication terminal may send a request of acquiring the second communication number to the server, so that the server sends the second communication number corresponding to the order request to the second communication terminal.

In the order data interaction method provided in an example embodiment of the present disclosure, during the flow for processing order data, the present disclosure binds a temporarily allocated second communication number with an order request and sets a correlation between the second communication number and a first communication number used by a user. Thus, during the whole flow for processing the order request, a relevant third party can only acquire the second communication number, and contact the user by using the second communication number, thereby effectively preventing the third party from acquiring the first communication number used by the user, and protecting user privacy.

In a specific application scenario, a user issues an order request through online shopping. A server receives the order request, reads a first communication number carried in the order request, allocates a second communication number to the first communication number, and sends correlation information to a basic communication server to bind the first communication number with the second communication number. The server may use the second communication number as a part of a content of the order request, and replace the first communication number in the order request. Furthermore, the server sends the order request to the second communication terminal, so that the second communication terminal at each of the store or logistics companies obtain the order request having a biding relation with the second communication number, and may further respond to the order request. Therefore, during the above process, the persons of the stores or logistics companies cannot obtain the user's first communication number, thereby effectively preventing the leaking of user privacy.

In another specific application scenario, a user may send an order request for booking a taxi through a taxi booking software. A server receives the order request, acquires a first communication number carried in the order request, allocates a second communication number to the first communication number, and sends correlation information to a basic communication server to correlate the first communication number with the second communication number. The server may use the second communication number as a part of the content of the order request, and replace the first communication number in the order request. Furthermore, the server sends the order request by broadcasting, to enable a second communication terminal corresponding to the server to receive the order request. That is, taxi drivers receive the order request, acquire the second communication number, and contact the user by using the second communication number. Thus, the user's first communication number will not be leaked, thereby effectively protecting user privacy.

Figure 2:
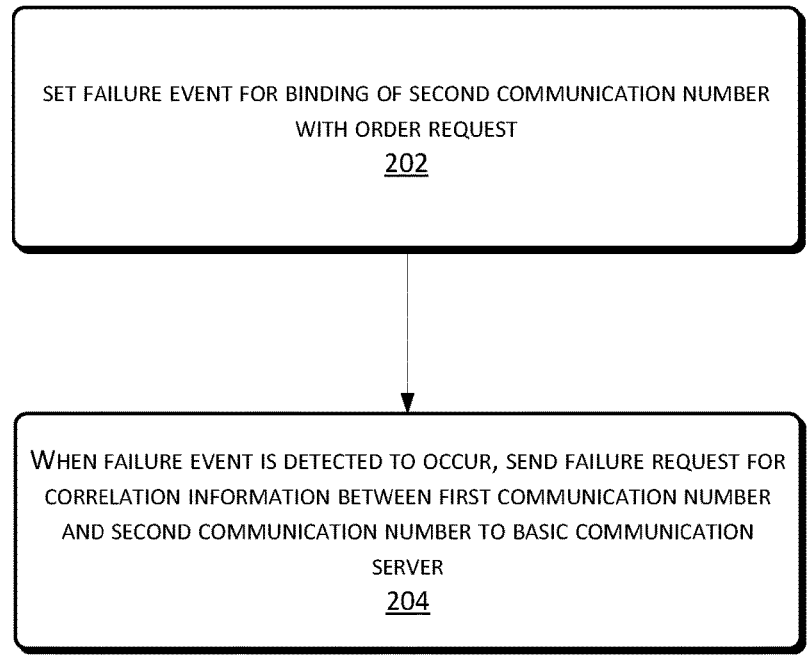
FIG. 2 is a flow chart of an example data interaction method according to an example embodiment of the present disclosure.

Referring to FIG. 2, in an example embodiment of the present disclosure, the method further includes the following operations:

At 202, a failure event is set for the binding of the second communication number with the order request.

At 204, when the failure event is detected to occur, a failure request for the correlation information between the first communication number and the second communication number is sent to the basic communication server.

In this example embodiment, by way of setting a failure event for the binding of the second communication number with the order request, once the failure event occurs, the binding relation between the second communication number and the order request is released, which further enables the basic communication server to release the binding relation between the first communication number and the second communication number. Thus, when the processing of one order request is finished, a third party involved in the processing of the order request cannot contact the user again through the second communication number, and then even if the second communication number obtained by the third party is leaked, it does not cause troubles to the user.

In this example embodiment, a failure time is set for the order request, which may start calculating from a time point when the order request is generated. The failure event may include that a current time length of the order request exceeds the failure time. The failure event may also include that a state of the order request is switched to completed or failed. That is, when the order request is processed, its state is changed along with the progress. The states may include states such as the request having been delivered, the request having been acknowledged by the seller, the request having been paid by the buyer, the goods having been shipped by the seller, and the transaction being completed, and so on. A state that a goods receipt has been confirmed may indicate that the order request is completed. Certainly, the state may further include: the request having been delivered, the order being circled, the order having been successfully accepted, the order being completed, and so on. During the above process, if both the seller and the buyer cancel the transaction, the order request then becomes invalid. Certainly, the failure event may further include other events, and those skilled in the art may further make other variations under the teaching of the technical essence of the present disclosure, while all the variations shall fall within the protection scope of the present disclosure as long as the implemented functions and effects thereof are the same as or similar to that of the present disclosure.

In this example embodiment, when a set failure event occurs, a failure request is sent to the basic communication server, so that the basic communication server may cancel the correlation between the first communication number and the second communication number according to the failure request. Thus, when receiving a communication request to the second communication number, the basic communication server will not convert the communication request into a call to the first communication number. Therefore, a third party, who has acquired the second communication number, cannot contact the user by using the first communication number, thereby avoiding the leakage of the user's first communication number, and preventing the user from being disturbed by malicious sellers.

In an example embodiment, the failure event includes that a current time exceeds a set valid time. In this example embodiment, a valid time is set for the order request. The valid time may be a specific time point, and when a current time exceeds the specific time point, it indicates that the current time exceeds the set valid time. For example: the valid time is 24:00, Mar. 10, 2015, and when a current time exceeds this time point, the order request may be automatically invalid. The valid time may also be a time length, which may be calculated from a time point when the order request is generated, or may be calculated since the server receives the order request. When a difference between a current time and the time point when the order request starts to be calculated is larger than a set time length, it indicates that the current time exceeds the set valid time. For example, the time length is 10 days, and a time point when the order request is generated is 12:00, Feb. 11, 2015. When a difference between the current time and the time point when the order request is generated is larger than 10 days, the order request is invalid.

In an example embodiment, the failure event is determined according to a state of the order request. The failure event includes that the order request is invalid. In this example embodiment, at different stages of a life cycle of the order request, the order request may have different states. The failure event includes that the order request is invalid, which indicates that the order request is in a failure state. At this time, correlation between the first communication number and the second communication number is canceled. In a specific example embodiment, taking online shopping for example, the order request is generated when submitted by a user, processed by a store, and then a logistics company delivers the goods of the order request. The order request may involve the following states such as the request having been delivered, the request having been acknowledged by the seller, the request having been paid by the buyer, the goods having been delivered by the seller, the transaction being canceled and the transaction being completed, and so on. When the state of the order request is the transaction being completed or the transaction being canceled, it may indicate that the order request is invalid. In a specific example embodiment, taking online taxi booking service for example, the order request may involve states such as the request having been delivered, the order being scrambled for, the order having been successfully scrambled, the order being completed, and so on. When the state of the order request is the order being completed, it may indicate that the order request is invalid.

Figure 3:
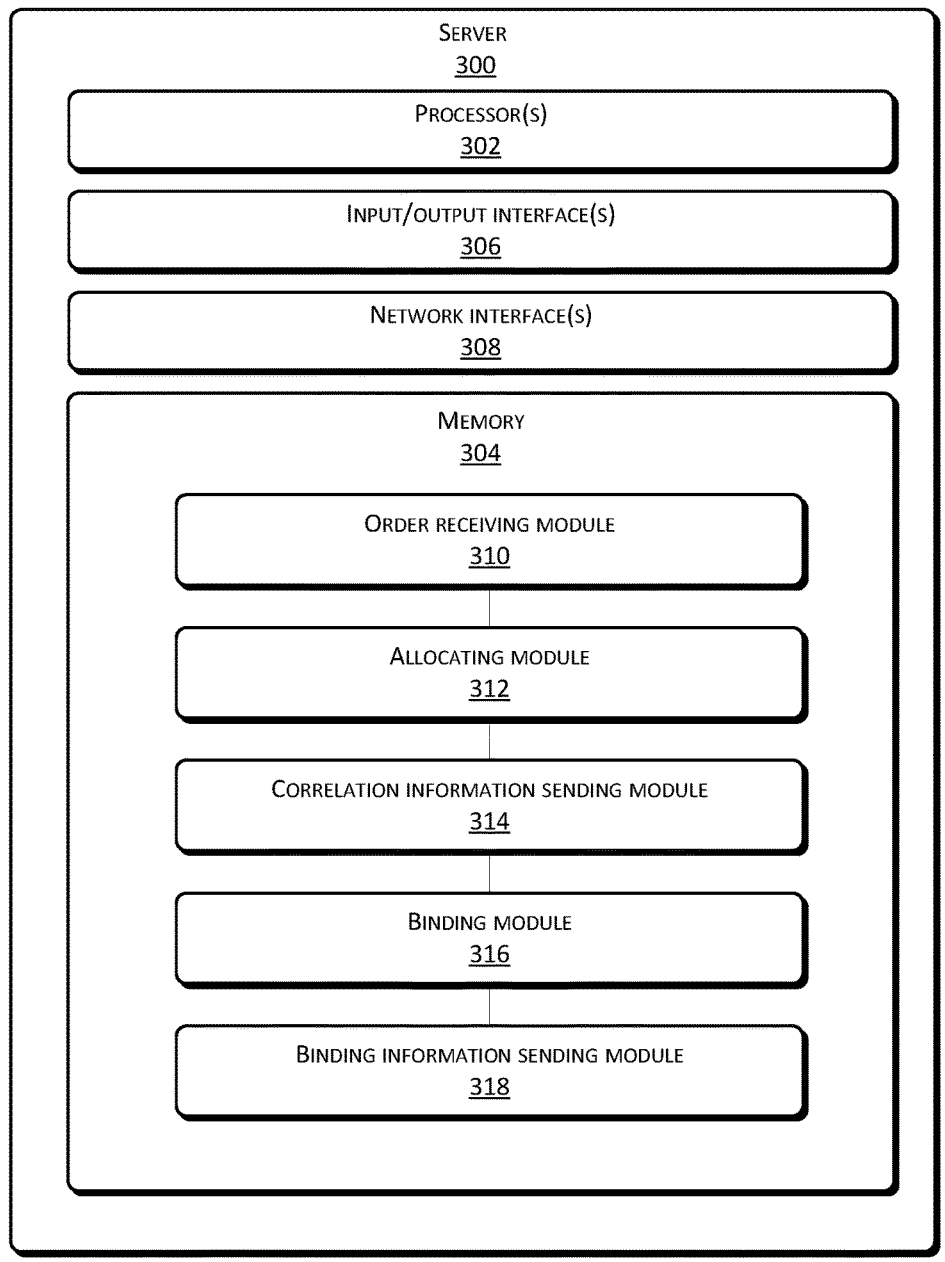
FIG. 3 is a block diagram of an example server according to an example embodiment of the present disclosure.

Referring to FIG. 3, an example embodiment of the present disclosure further provides a server 300, which includes one or more processor(s) 302 or data processing unit(s) and memory 304. The server 300 may further include one or more input/output interface(s) 306, and network interface(s) 308. The memory 304 is an example of computer-readable media.

The computer-readable media includes volatile and non-volatile, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 304 may store therein a plurality of modules or units including an order receiving module 310, an allocating module 312, a correlation information sending module 314, a binding module 316, and a binding information sending module 318.

The order receiving module 310 receives an order request from a first communication terminal, and acquires a first communication number according to the order request.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal may be used by a user to send an order request.

In this example embodiment, the order request may include ordering evidence in a trading transaction, and its specific content may include a commodity and/or service ordered by a user.

In this example embodiment, the order request may carry the first communication number, and specifically, for example, the order request may include the first communication number. In this way, after the order request is received, the first communication number can be acquired. The order request may also not include the first communication number. In this case, through identity information included in the order request, the first communication number corresponding to the identity information can be read from a local database.

In this example embodiment, the first communication number may be a user's telephone number, which may be a landline telephone number or a mobile phone number. The number segment is not restricted.

The allocating module 312 allocates a second communication number to the first communication number, and sets a correlation between the first communication number and the second communication number.

In this example embodiment, the second communication number is used as a temporary communication number. The allocating a second communication number to the first communication number may include: pre-storing at least one second communication number locally in the server 300, and selecting one from the at least one second communication number to allocate to the first communication number; or, after the order request is received, generating a second communication number according to a pre-set rule.

In a specific example embodiment, a communication number set is set locally in the server 300, and the communication number set includes at least one second communication number. In this way, a value range of the second communication number is effectively defined, and usage condition of the second communication number is managed. For example, in the current situation about selecting the existing communication numbers, the seldom used numbers may be used as temporary communication numbers; numbers in a certain segment may be used as temporary communication numbers. For instance, numbers falling within "95000000000~95011111111" are used as temporary communication numbers.

In this example embodiment, the allocating module 312 sets the correlation between the first communication number and the second communication number. For example, the server 300 stores and correlates the second communication number and the first communication number with each other in a manner of a data table. That is, one column in the data table stores the first communication number, another column stores the second communication number, and the first communication number and the second communication number correlated with each other are located in the same line. Alternatively, the server 300 may store the first communication number and an index of the second communication number corresponding to each other. For example, a serial number is given to each second communication number in the communication number set, and the serial number is an index of the corresponding second communication number. By using the index, a second communication number is uniquely determined. Thus, by way of storing the first communication number and the index correspondingly, the second communication number corresponding to the first communication number is figured out.

The correlation information sending module 314 sends correlation information to a basic communication server, in which the correlation information carries the first communication number and the second communication number.

In this example embodiment, the basic communication server may be a server of a telecom operator, which calls a communication number according to a call request.

In this example embodiment, the correlation information sending module 314 sends the correlation information to the basic communication server, which indicates that there is a need to correlate the first communication number with the second communication number carried by the correlation information. When receiving a call request to the second communication number, the basic communication server converts the call request into a call to the first communication number.

In this example embodiment, the correlation information carries the first communication number and the second communication number, and both the first communication number and the second communication number may be used as content or a part of the content of the correlation information. Alternatively, one of the second communication number and the first communication number is used as content or a part of the content of the correlation information, with the other one being used as an attachment. Alternatively, both the second communication number and the first communication number may be used as attachments of the correlation information. For example, the second communication number may be "12345678900", the first communication number may be "17095058888." A content of the correlation information may be "Binding 17095058888&12345678900", "17095058888&12345678900", "Binding 17095058888" with "12345678900" being used as an attachment, "Binding 12345678900" with "17095058888" being used as an attachment, or "Binding" with both "17095058888" and "12345678900" being used as the attachments.

The binding module 316 binds the second communication number with the order request.

In this example embodiment, the binding module 316 binds the second communication number with the order request. Thus, in a subsequent step for processing the order request, when a third party reads and processes the order request, it can only acquire the second communication number, instead of acquiring the user's first communication number, thereby effectively protecting the user's communication number.

In this example embodiment, the binding module 316 binds the second communication number with the order request in the following ways including: setting the second communication number as a part of the content of the order request; setting the second communication number as an attachment of the order request; storing the order request and the second communication number corresponding to each other; or storing an order serial number of the order request and the second communication number corresponding to each other, in which the order serial number uniquely identifies an order request. Certainly, the way of binding the second communication number with the order request is not limited to the above cited examples, and those skilled in the art may further make other variations under the teaching of the technical essence of the present disclosure, while all the variations shall fall within the protection scope of the present disclosure as long as the implemented functions and effects thereof are the same as or similar to that of the present disclosure.

The binding information sending module 318 sends the order request having a binding relation with the second communication number to a second communication terminal.

In this example embodiment, the second communication terminal may be a smart phone, a desktop computer, a notebook computer, a tablet personal computer, or a smart wearable device. Certainly, a user terminal may also be a software entity that is executable by any of the devices listed above. The second communication terminal may be set at commercial operating places or facilities, for example, stores for selling products, companies for providing logistics services, or taxies.

In this example embodiment, the binding information sending module 318 sends the order request to a second communication terminal, which enables the second communication terminal to acquire a content of the order request, and also to acquire the second communication number having a binding relation with the order request according to the order request. Corresponding to a binding mode between the second communication number and the order request, the second communication terminal may have a correspondingly different way of acquiring the second communication number according to the order request. For example, when the second communication number is a part of the content of the order request, the second communication number is directly read from the order request; when the second communication number is an attachment of the order request, after acquiring the order request, the second communication terminal reads the attachment of the order request, and further acquire the second communication number; and when the order request and the second communication number are stored in a server corresponding to each other, the second communication terminal may send a request of acquiring the second communication number to the server, so that the server sends the second communication number corresponding to the order request to the second communication terminal.

Figure 4:
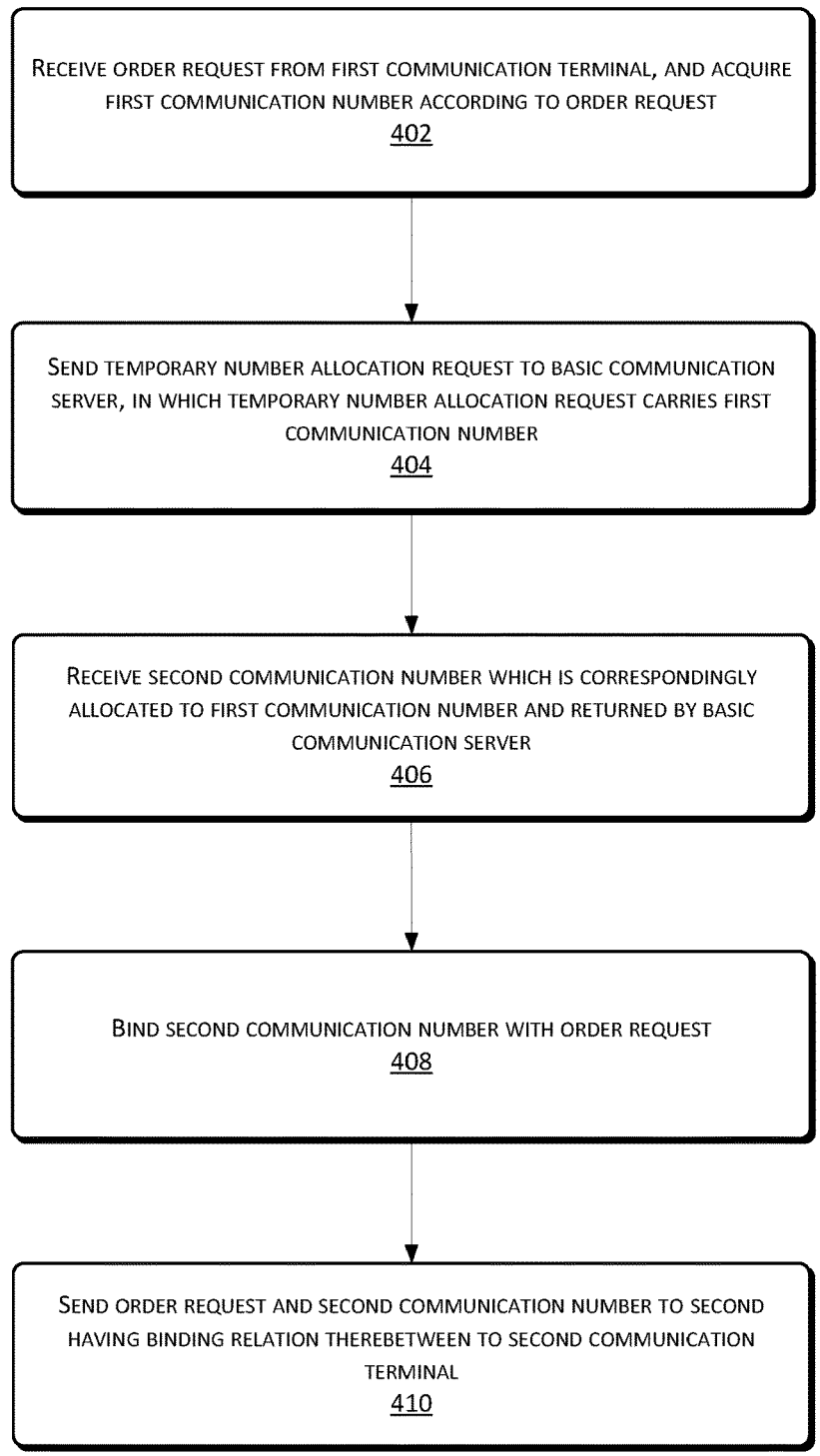
FIG. 4 is a flow chart of an example data interaction method according to an example embodiment of the present disclosure.

Referring to FIG. 4, an example embodiment of the present disclosure further provides an example order data interaction method, which includes the following steps:

At 402, an order request is received from a first communication terminal, and a first communication number is acquired according to the order request.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal may be used by a user to send an order request.

In this example embodiment, the order request may include ordering evidence in a trading transaction, and its specific content may include a commodity and/or service ordered by a user.

In this example embodiment, the order request may carry the first communication number, and, for example, the order request may include the first communication number. In this way, after the order request is received, the first communication number is acquired. Alternatively, the order request does not include the first communication number. In this case, through identity information included in the order request, the first communication number corresponding to the identity information is read from a local database.

In this example embodiment, the first communication number may be a user's telephone number, which may be a landline telephone number or a mobile phone number. The number segment is not restricted.

At 404, a temporary number allocation request is sent to a basic communication server, in which the temporary number allocation request carries the first communication number.

In this example embodiment, the basic communication server may be a server of a telecom operator, which calls a communication number in response to a call request of a communication terminal.

In this example embodiment, the temporary number allocation request represents that the user applies a temporary communication number directed to his/her first communication number, so that the temporary communication number is adopted during the subsequent communication with a third party, thereby avoiding the leakage of the first communication number. The temporary number allocation request may have a pre-set form. The temporary number allocation request may have a pre-set content. For example, the content thereof may be "Request temporary number". Certainly, the form and the content of the temporary number allocation request are not limited to the above example.

In this example embodiment, the temporary number allocation request carries the first communication number, which may include that the first communication number is content or a part of the content of the temporary number allocation request. For example, the first communication number is "17095058888." The temporary number allocation request may be only "17095058888", or "Request temporary number & 17095058888" as well. The temporary number allocation request carries the first communication number, and the first communication number may also be used as an attachment of the temporary number allocation request.

At 406, a second communication number, which is correspondingly allocated to the first communication number and returned by the basic communication server, is received.

In this example embodiment, the basic communication server, in response to the temporary number allocation request, allocates a temporary communication number to the first communication number. The temporary communication number is the second communication number. For example, at least one temporary communication number is pre-stored in the basic communication server, and one of the at least one temporary communication number is selected and allocated to an original communication number; or after the basic communication server receives an allocation request, one temporary communication number is generated according to a pre-set rule, and the generated temporary communication number is allocated to the first communication number.

In this example embodiment, the correspondingly allocating the second communication number to the first communication number may indicate that a one-to-one relation may exist between each first communication number and the temporary communication number. Thus, when receiving a call request directed to a temporary communication number, the basic communication server determines a first communication number corresponding to the temporary communication number according to a corresponding relation therebetween, and then converts the call request directed to the temporary communication number into a call to the first communication number.

At 408, the second communication number is bound with the order request.

In this example embodiment, the binding of the second communication number with the order request enables that, in a subsequent step for processing the order request, when a third party reads and processes the order request, it can only acquire the second communication number, instead of acquiring the user's first communication number, thereby effectively protecting the user's communication number.

In this example embodiment, the binding of the second communication number with the order request may be implemented in the following ways, which may include: setting the second communication number as a part of the content of the order request; setting the second communication number as an attachment of the order request; storing the order request and the second communication number corresponding to each other; or storing an order serial number of the order request and the second communication number corresponding to each other, in which the order serial number uniquely identifies an order request. Certainly, the way of binding the second communication number with the order request is not limited to the above examples, and those skilled in the art may further make other variations under the teaching of the technical essence of the present disclosure, while all the variations shall fall within the protection scope of the present disclosure as long as the implemented functions and effects thereof are the same as or similar to that of the present disclosure.

At 410, the order request and the second communication number having a binding relation therebetween are sent to a second communication terminal.

In this example embodiment, the second communication terminal may be a smart phone, a desktop computer, a notebook computer, a tablet personal computer, or a smart wearable device. Certainly, a user terminal may also be a software entity that is executable by any of the devices listed above. The second communication terminal may be set at commercial operating places or facilities, for example, stores for selling products, companies for providing logistics services, or taxies.

In this example embodiment, the order request is sent to a second communication terminal, which enables the second communication terminal to acquire a content of the order request, and also to acquire the second communication number having a binding relation with the order request according to the order request. Corresponding to a binding mode between the second communication number and the order request, the second communication terminal may have a correspondingly different way of acquiring the second communication number according to the order request. For example, when the second communication number is a part of the content of the order request, the second communication number is be directly read from the order request; when the second communication number is an attachment of the order request, after acquiring the order request, the second communication terminal reads the attachment of the order request, and further acquires the second communication number; and when the order request and the second communication number are stored in a server corresponding to each other, the second communication terminal may send a request of acquiring the second communication number to the server, so that the server sends the second communication number corresponding to the order request to the second communication terminal.

In the order data interaction method provided in the example embodiments of the present disclosure, during the flow for processing order data, the present disclosure binds a temporarily allocated second communication number with an order request and sets a correlation between the second communication number and the first communication number used by a user. Thus, during the whole flow for processing the order request, a relevant third party can only acquire the second communication number, and contact the user by using the second communication number, thereby effectively preventing the third party from acquiring the first communication number used by the user, and protecting user privacy.

In addition, a failure event for the binding of the second communication number with the order request is set; and when the failure event is detected to occur, a failure request for correlation information between the first communication number and the second communication number is sent to the basic communication server. Details may refer to FIG. 2 and its accompanying descriptions, which are not detailed herein.

Figure 5:
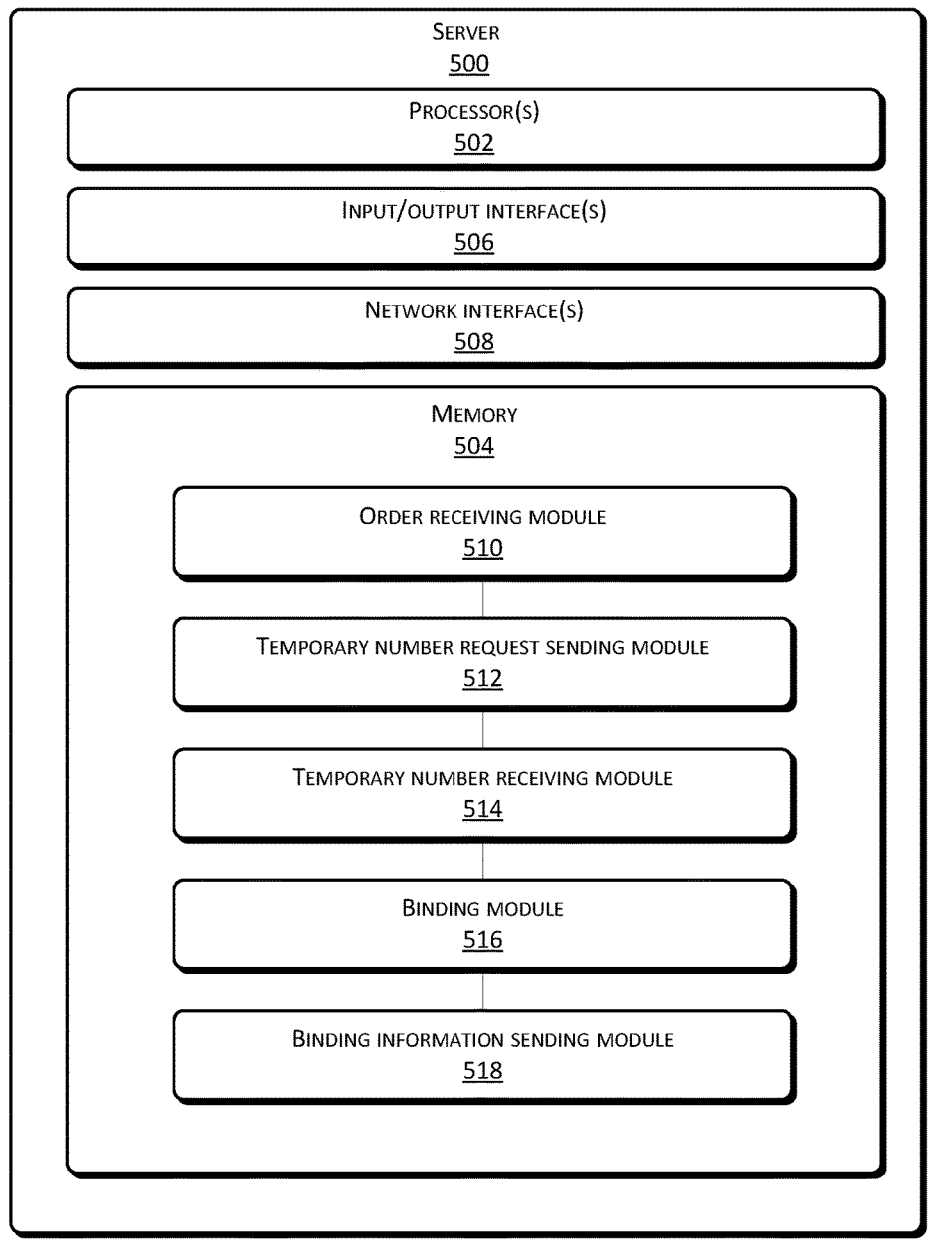
FIG. 5 is a block diagram of an example server according to an example embodiment of the present disclosure.

Referring to FIG. 5, an example embodiment of the present disclosure further provides a server 500, which includes one or more processor(s) 502 or data processing unit(s) and memory 504. The server 500 may further include one or more input/output interface(s) 506, and network interface(s) 508. The memory 504 is an example of computer-readable media.

The memory 504 may store therein a plurality of modules or units including an order receiving module 510, a temporary number request sending module 512, a temporary number receiving module 514, a binding module 516, and a binding information sending module 518.

The order receiving module 510 receives an order request from a first communication terminal, and acquires a first communication number according to the order request.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal may be used by a user to send an order request.

In this example embodiment, the order request may include ordering evidence in a trading transaction, and its specific content may include a commodity and/or service ordered by a user.

In this example embodiment, the order request may carry the first communication number. For example, the order request may include the first communication number. In this way, after the order request is received, the first communication number is acquired. Alternatively, the order request does not include the first communication number. In this case, through identity information included in the order request, the first communication number corresponding to the identity information can be read from a local database.

In this example embodiment, the first communication number may be a user's telephone number, which may be a landline telephone number or a mobile phone number. There is no restriction on the number segment.

The temporary number request sending module 512 sends a temporary number allocation request to a basic communication server, in which the temporary number allocation request carries the first communication number.

In this example embodiment, the basic communication server may be a server of a telecom operator, which calls a communication number in response to a call request of a communication terminal.

In this example embodiment, the temporary number allocation request represents that the user applies a temporary communication number directed to his/her first communication number, so that the temporary communication number is adopted during the subsequent communication with a third party, thereby avoiding the leakage of the first communication number. The temporary number allocation request may have a pre-set form. The temporary number allocation request may have a pre-set content such that the content thereof may be "Request temporary number". Certainly, the form and the content of the temporary number allocation request are not limited to the above cited example.

In this example embodiment, the temporary number allocation request carries the first communication number, which may include that the first communication number is content or a part of the content of the temporary number allocation request. For example, the first communication number is "17095058888". The temporary number allocation request may be only "17095058888", or "Request temporary number & 17095058888". The temporary number allocation request carries the first communication number. Alternatively, the first communication number may be used as an attachment of the temporary number allocation request.

The temporary number receiving module 514 receives a second communication number, correspondingly allocated to the first communication number, returned by the basic communication server.

In this example embodiment, the basic communication server, in response to the temporary number allocation request, allocates a temporary communication number to the first communication number. The temporary communication number is the second communication number. For example, at least one temporary communication number is be pre-stored in the basic communication server, and one of the at least one temporary communication number is selected and allocated to an original communication number; or after the basic communication server receives an allocation request, one temporary communication number is generated according to a pre-set rule, and the generated temporary communication number is allocated to the first communication number.

In this example embodiment, the correspondingly allocating the second communication number to the first communication number may indicate that a one-to-one relation may exist between each first communication number and the temporary communication number. Thus, when receiving a call request directed to a temporary communication number, the basic communication server determines a first communication number corresponding to the temporary communication number according to a corresponding relation therebetween, and then converts the call request directed to the temporary communication number into a call to the first communication number.

The binding module 516 binds the second communication number with the order request.

In this example embodiment, the binding module 516 binds the second communication number with the order request, which enables that, in a subsequent step for processing the order request, when a third party reads and processes the order request, it can only acquire the second communication number, instead of acquiring the user's first communication number, thereby effectively protecting the user's communication number.

In this example embodiment, the binding of the second communication number with the order request may be implemented in the following ways, which may include: setting the second communication number as a part of the content of the order request; setting the second communication number as an attachment of the order request; or storing the order request and the second communication number corresponding to each other; or storing an order serial number of the order request and the second communication number corresponding to each other, in which the order serial number uniquely identifies an order request. Certainly, the way of binding the second communication number with the order request is not limited to the above examples, and those skilled in the art may further make other variations under the teaching of the technical essence of the present disclosure, while all the variations shall fall within the protection scope of the present disclosure as long as the implemented functions and effects thereof are the same as or similar to that of the present disclosure.

The binding information sending module 518 forwards the order request and the second communication number having a binding relation therebetween to a second communication terminal.

In this example embodiment, the second communication terminal may be a smart phone, a desktop computer, a notebook computer, a tablet personal computer, or a smart wearable device. Certainly, a user terminal may also be a software entity that is executable by any of the devices listed above. The second communication terminal may be set at commercial operating places or facilities, for example, stores for selling products, companies for providing logistics services, or taxies.

In this example embodiment, the binding information sending module 518 sends the order request to the second communication terminal, which enables the second communication terminal to acquire a content of the order request, and also to acquire the second communication number having a binding relation with the order request according to the order request. Corresponding to a binding mode between the second communication number and the order request, the second communication terminal may have a corresponding different way of acquiring the second communication number according to the order request. For example, when the second communication number is a part of the content of the order request, the second communication number is directly read from the order request; when the second communication number is an attachment of the order request, after acquiring the order request, the second communication terminal reads the attachment of the order request, and further acquires the second communication number; and when the order request and the second communication number are stored in a server corresponding to each other, the second communication terminal may send a request of acquiring the second communication number to the server, so that the server sends the second communication number corresponding to the order request to the second communication terminal.

As shown from the technical solutions provided by the example embodiments of the present disclosure, during the flow for processing an order data, the present disclosure binds a temporarily allocated temporary communication number with an order request and sets a correlation between the second communication number and a first communication number used by a user. Thus, during the whole flow for processing an order request, a relevant third party can only acquire the second communication number, and contact the user by using the second communication number, thereby effectively preventing the third party from acquiring the first communication number used by the user, and protecting user privacy.

Although the present disclosure has been described through the example embodiments, those ordinarily skilled in the art shall know that, many modifications and variations may be made to the present disclosure, without departing from the spirits of the present disclosure, and the appended claims are expected to cover those modifications and variations without departing from the spirits of the present disclosure.

What is claimed is:

1. A method comprising:
    receiving an order request sent by a first communication terminal, the order request including evidence of ordering at least one of a commodity or a service;
    acquiring a first communication number according to the order request;
    allocating a second communication number to the first communication number;
    setting a correlation between the first communication number and the second communication number;
    binding the second communication number with the order request; and
    providing the second communication number when a third party processes the order request.

2. The method of claim 1, further comprising:
    sending correlation information to a basic communication server, the correlation information carrying the first communication number and the second communication number.

3. The method of claim 2, further comprising:
    sending the order request having a binding relation with the second communication number to a second communication terminal.

4. The method of claim 1, further comprising:
    setting a failure event for the binding of the second communication number with the order request.

5. The method of claim 4, further comprising:
    sending a failure request for the correlation information between the first communication number and the second communication number, when detecting that the failure event occurs.

6. The method of claim 4, wherein the failure event includes that a current time exceeds a set valid time.

7. The method of claim 4, wherein the failure event is determined according to a state of the order request.

8. The method of claim 4, wherein the failure event includes that the order request is invalid.

9. A method comprising:
    receiving an order request from a first communication terminal, the order request including evidence of ordering at least one of a commodity or a service;
    acquiring a first communication number according to the order request;
    sending a temporary number allocation request to a basic communication server, the temporary number allocation request carrying the first communication number;
    receiving a second communication number, correspondingly allocated to the first communication number, returned by the basic communication server; and
    binding the second communication number with the order request;
    providing the second communication number when a third party processes the order request.

10. The method of claim 9, further comprising sending the order request and the second communication number having a binding relation there between to a second communication terminal.

11. The method of claim 9, further comprising:
    setting a failure event for the binding of the second communication number with the order request.

12. The method of claim 11, further comprising:
    sending a failure request of the correlation information between the first communication number and the second communication number, when detecting that the failure event occurs.

13. The method of claim 11, wherein the failure event includes that a current time exceeds a set valid time.

14. The method of claim 11, wherein the failure event is determined according to a state of the order request.

15. The method of claim 11, wherein the failure event includes that the order request is invalid.

16. A server comprising:
    an order receiving module that receives an order request from a first communication terminal, and acquires a first communication number according to the order request, the order request including evidence of ordering at least one of a commodity or a service;
    an allocating module that allocates a second communication number to the first communication number, and sets a correlation between the first communication number and the second communication number;
    a correlation information sending module that sends correlation information to a basic communication server, the correlation information carrying the first communication number and the second communication number;
    a binding module that binds the second communication number with the order request, and provides the second communication number when a third party processes the order request; and a binding information sending module that sends the order request having a binding relation with the second communication number to a second communication terminal.

17. The server of claim 16, wherein the binding module further sets a failure event for the binding of the second communication number with the order request.

18. The server of claim 17, wherein the binding module sends a failure request to the basic communication server for the correlation information between the first communication number and the second communication number, when detecting that the failure event occurs.

19. The server of claim 17, wherein the failure event includes that a current time exceeds a set valid time.

20. The server of claim 17, wherein:
the failure event is determined according to a state of the order request; and
the failure event includes that the order request is invalid.

* * * * *